(12) United States Patent
Magdalin et al.

(10) Patent No.: US 8,001,125 B1
(45) Date of Patent: Aug. 16, 2011

(54) METHOD AND APPARATUS FOR DEFINING RELATIONSHIPS BETWEEN TAGS

(75) Inventors: Vladimir Magdalin, Citrus Heights, CA (US); Marcus Tad Milbourn, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 436 days.

(21) Appl. No.: 12/182,249

(22) Filed: Jul. 30, 2008

(51) Int. Cl.
*G06F 17/30* (2006.01)
*G06F 17/00* (2006.01)
*G06F 15/16* (2006.01)
*G06F 9/44* (2006.01)
*G06F 5/00* (2006.01)

(52) U.S. Cl. .......... 707/737; 707/817; 707/45; 715/206; 717/124

(58) Field of Classification Search .................. 707/737, 707/817; 715/206; 709/204; 717/124; 706/45
See application file for complete search history.

(56) References Cited

U.S. PATENT DOCUMENTS

| | | | |
|---|---|---|---|
| 6,718,516 B1 * | 4/2004 | Claussen et al. | 715/234 |
| 6,970,870 B2 * | 11/2005 | Dweck et al. | 1/1 |
| 7,146,564 B2 * | 12/2006 | Kim et al. | 715/235 |
| 2003/0084048 A1 * | 5/2003 | Dweck et al. | 707/10 |
| 2003/0120686 A1 * | 6/2003 | Kim et al. | 707/200 |
| 2007/0208679 A1 * | 9/2007 | Tseng et al. | 706/45 |
| 2007/0226691 A1 * | 9/2007 | Happell et al. | 717/124 |
| 2007/0239761 A1 * | 10/2007 | Baio et al. | 707/102 |
| 2008/0183816 A1 * | 7/2008 | Morris | 709/204 |
| 2008/0235194 A1 * | 9/2008 | Shima et al. | 707/3 |
| 2009/0100078 A1 * | 4/2009 | Lai et al. | 707/100 |
| 2009/0299725 A1 * | 12/2009 | Grigsby et al. | 704/2 |
| 2010/0017378 A1 * | 1/2010 | Gopalakrishnan | 707/4 |

* cited by examiner

*Primary Examiner* — Frantz Coby
(74) *Attorney, Agent, or Firm* — Park, Vaughan, Fleming & Dowler LLP; Mark Spiller (57) ABSTRACT

One embodiment of the present invention provides a system that facilitates defining relationships between tags. During operation, the system receives a user-specified tag that describes a data item. Next, the system displays this tag to a user via a user interface that gives the user the option to suggest additional relationships for the tag. Based on user input, the system may define a relationships between the two tags, thereby facilitating the definition of a set of related tags for an organization.

18 Claims, 6 Drawing Sheets

METHOD AND APPARATUS FOR DEFINING RELATIONSHIPS BETWEEN TAGS

BACKGROUND

Related Art

Many modern information systems often include "tags," which specify terms associated with data items, to facilitate finding specific data items during searches. Such tagging techniques have become widely used for organizing online information over the past several years. A data item's tags may be defined in a number of ways. For instance, tags may be defined by the data item's creator or by someone accessing the data item. Moreover, tagging data items in a standardized manner can facilitate finding other related data items that have similar tags.

Recently-developed data grouping techniques that incorporate tagging allow items to be organized "loosely," and found via one or many descriptors. Such techniques are quite different from previous data organization techniques, which use formal folder-based approaches that allow a particular item to only appear in one organizational container. This is similar to tagging systems where only one tag per entity is allowed. However, it is difficult to provide standardized tagging for data items, and this problem can limit the benefits of tagging. For instance, finding a second data item that is closely related to a given data item may be difficult when the two data items are described by different, but synonymous, tags.

SUMMARY

One embodiment of the present invention provides a system that facilitates defining relationships between tags. During operation, the system receives a user-specified tag that describes a data item. Next, the system displays this tag to a user via a user interface that gives the user the option to suggest additional relationships for the tag. Based on user input, the system may define a relationship between the two tags, thereby facilitating the definition of a set of related tags for an organization.

In some embodiments, multiple synonymous tags may describe a given data item. By defining relationships between such tags, the system facilitates associating additional descriptive terms with data items, thereby improving the likelihood that a given data item can be found during a search operation.

In some embodiments, the system expresses the strength of the relationship between two tags using a percentage scale.

In some embodiments, a relationship between two tags may indicate that: the two tags are unrelated; the two tags specify loosely-related concepts; the two tags specify closely-related concepts; and/or that the two tags are synonymous.

In some embodiments, the two tags specify terms that are organization-specific, and the system facilitates defining relationships between organization-specific terms that might otherwise be difficult to relate automatically.

In some embodiments, the system tracks who has suggested relationships for the two tags and the set of relationship strengths defined for the two tags. In some embodiments, the system may average the set of relationship strengths between the two tags to determine an average value for the relationship between the two tags.

In some embodiments, the system tracks user-specified relationships to ensure that users cannot manipulate relationships between tags.

In some embodiments, the system includes a visualization tool that displays the relationships between tags and characteristics of such relationships (e.g., the strength of the relationships between tags).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Limitations of Tagging

Although many Internet-based systems use tagging to categorize data items, typical tagging techniques have limitations. For example, many tags may be associated with each data item, but ensuring that the same set of tag terms are used to describe related data items can be difficult. For instance, when describing a vehicle for sale in an online advertisement, one user might specify the tags "car" and "silver wheels," while a second user describing the same vehicle might specify the tags "automobile" and "alloy rims." A third user searching for such a vehicle might get very different search results based on the set of terms entered into a query (e.g., the user may receive only one, or neither, of the two advertisements in response to the query). In another example, a user tagging an entity as "ajax," and another user tagging another entity as "web2.0" will not properly establish a desired relationship between the two entities, even though the two tags are closely related. Similarly, an entity tagged with an organization-specific tag of "d4d" (an acronym for "design for delight") and another entity tagged with an expanded version of the acronym (e.g., the full string "design for delight") may not be easily identified as being related, even though the two tags are synonymous. Note that while some synonymous terms may be linked using automated techniques (e.g., using a dictionary and/or thesaurus to determine related terms), such automated techniques may only detect absolute synonyms and/or antonyms, and may not be able to handle newer and/or organization-specific terms (such as "d4d").

One embodiment of the present invention includes a system that enables users to identify relationships between tags to improve the usefulness and effectiveness of tagging techniques. For instance, such a system may allow a search for the tag "cold" to return photos tagged with "winter," because users have suggested that the two terms are closely related. The system can also allow users to define opposite relationships for two terms that are not related, e.g., to ensure that searches for "snow" do not return photos tagged as "nuclear winter."

User-Specified Relationships for Tags

Embodiments of the present invention provide a system that enables users to define relationships between tags. These embodiments may include input and storage techniques to manage these user-defined relationships, and may involve building a similarity model for a set of tags that are used to organize a set of data items. For instance, the system may use such relationship data when determining the set of data items to be returned for a query on a tag.

Figure 1A:
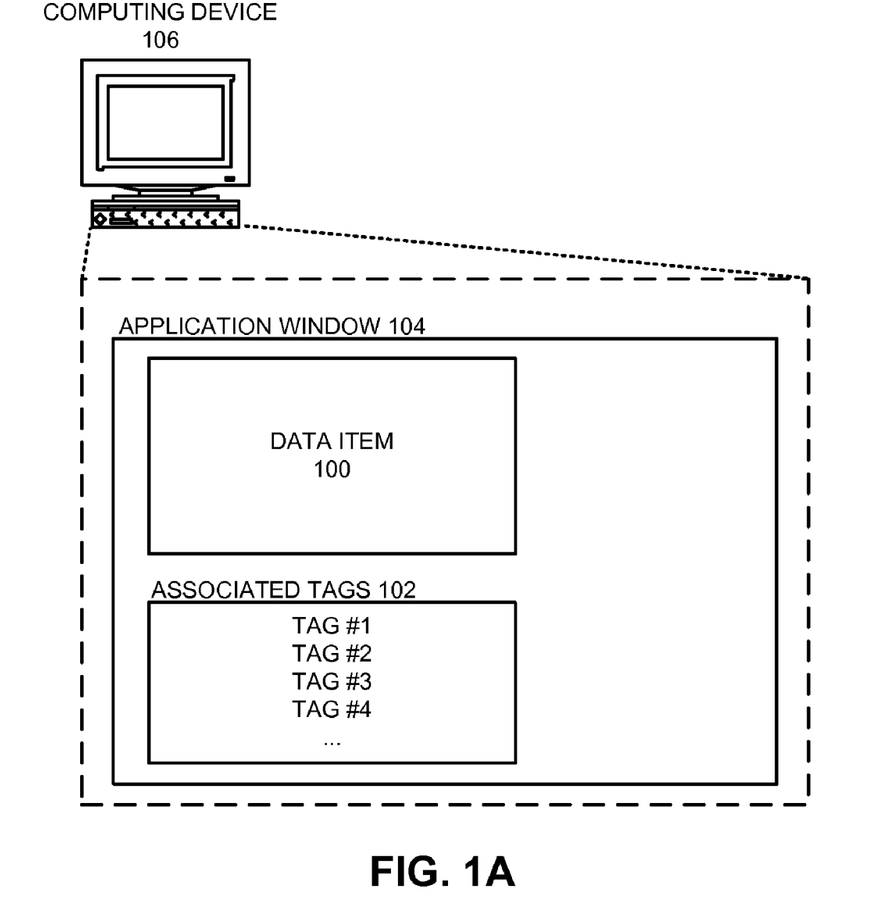
FIG. 1A illustrates a data item associated with a set of tags in accordance with an embodiment of the present invention.

FIG. 1A illustrates a data item 100 that is associated with a set of tags 102. For instance, data item 100 and associated tags 102 may be displayed in application window 104 of computing device 106. Note that data item 100 may be described by multiple synonymous (and/or non-synonymous, but still applicable) tags. For instance, a video of a horse running through snow may be tagged with terms such as "horse," "pony," "appaloosa," "winter ride," "snow," etc.

In some embodiments of the present invention, a user can select and suggest relationships for tags displayed in wide range of contexts. For instance, the user can select a tag from: a "tag cloud" (e.g., a visual depiction of tags that describes the content of a web site); a list of tags associated with a given data item; and/or a list of query results. For example, displayed tags may be associated with links and/or context menus that, when activated, enable a user to suggest a relationship for the selected tag.

In some embodiments of the present invention, defining a relationship between two tags involves expressing the strength of the relationship between the two tags using a percentage scale. For instance, depending on the percentage value chosen, the user may specify that: the initial tag and the second tag are unrelated; that the initial tag and the second tag specify loosely-related concepts; that the initial tag and the second tag specify closely-related concepts; and/or that the initial tag and the second tag are synonymous.

Figure 1B:
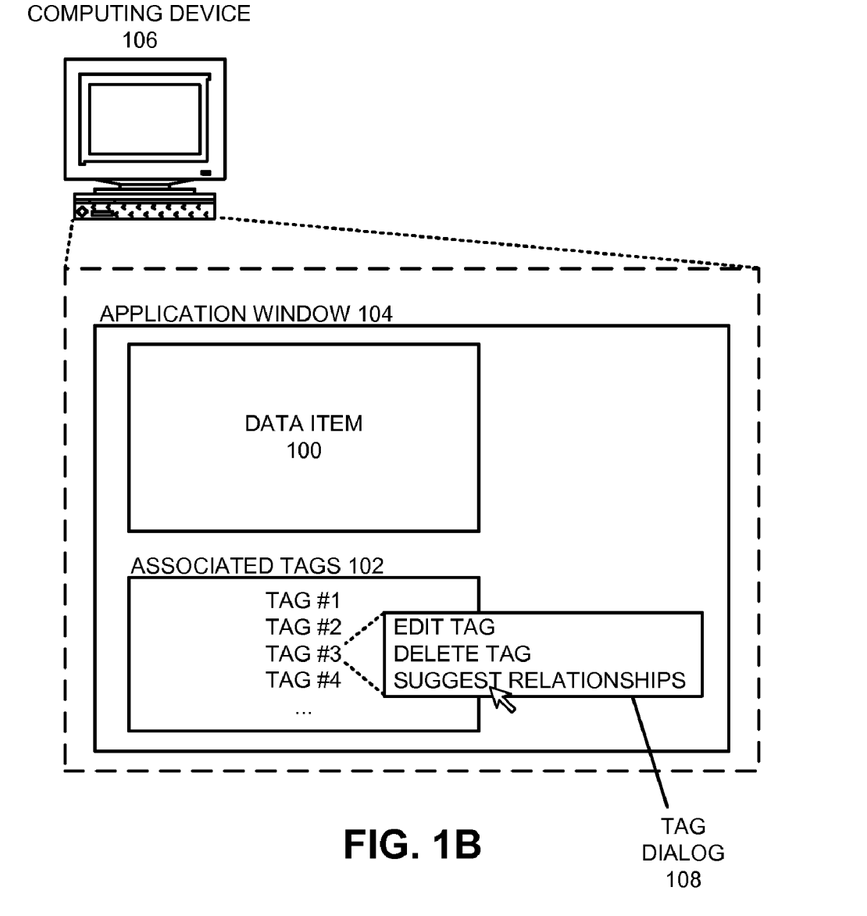
FIG. 1B illustrates a tag dialog that is displayed for a selected tag in accordance with an embodiment of the present invention.

FIG. 1B illustrates a tag dialog 108 that is displayed in application window 104 for a selected tag (Tag #3). For instance, a user might open tag dialog 108 by right-clicking a pointing device (such as a mouse) on one of associated tags 102.

Figure 1C:
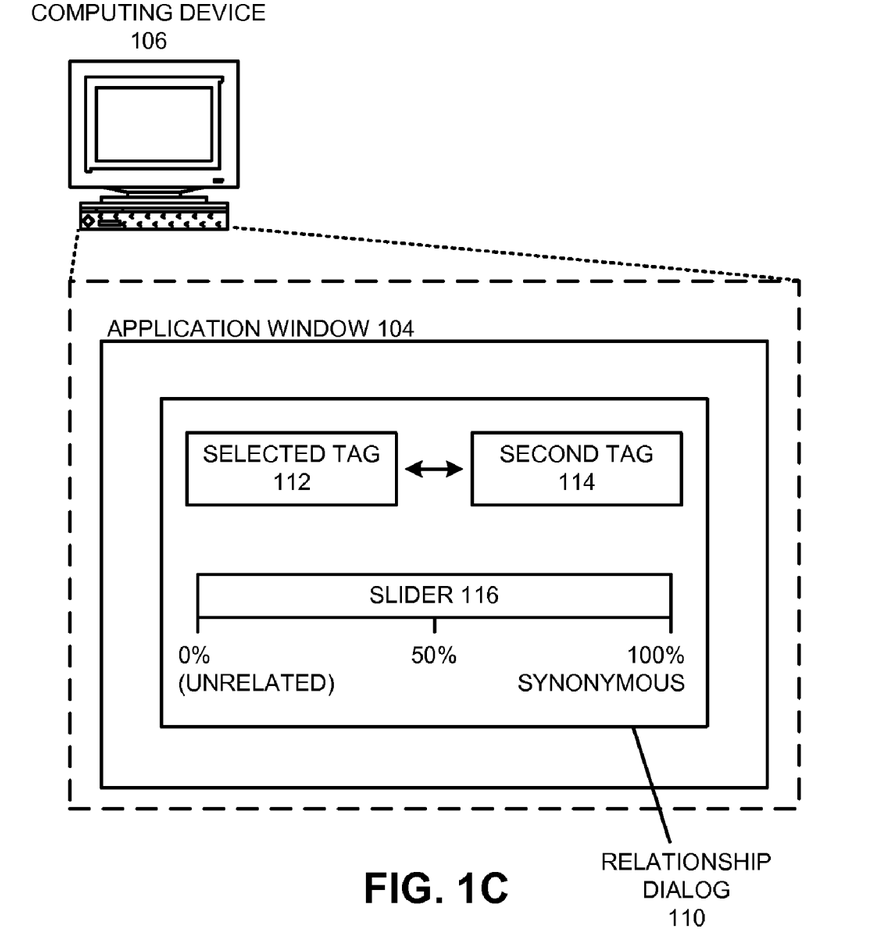
FIG. 1C illustrates a relationship dialog opened to allow a user to suggest a relationship for a tag in accordance with an embodiment of the present invention.

FIG. 1C illustrates a relationship dialog 110 opened by the system in response to a user selecting an option to suggest a relationship for a tag. Relationship dialog 110 may display the selected tag 112 and some mechanism (not shown) for selecting a second tag 114 (e.g., a search field, a scrollable list, or some other user interface mechanism). Relationship dialog 110 also includes slider 116, which can be adjusted by the user to indicate the type and strength of the relationship between selected tag 112 and second tag 114. In FIG. 1C, slider 116 indicates the relatedness of the two tags using a 0-100% percentage scale. For instance, a user may set the value of slider 116 to:

- a value of 0% to indicate that selected tag 112 and second tag 114 are completely unrelated (e.g., the tags "winter" and "cat");
- a value of 50% to specify somewhat related concepts, e.g., "web 2.0" and "JavaScript™," (JavaScript™ is a trademark of Sun Microsystems, Inc.) where the JavaScript™ language is often used for the web-based technologies of web 2.0;
- a value of 80% to specify closely-related concepts, e.g., the terms "innovation" and "invention," which are closely related, but not synonymous, or "C#" (a programming language) and "asp.net," the web application framework that includes C#; and;
- a value of 100% to specify terms that are synonymous (e.g., "product management" and its associated acronym, "PM").

Note that while slider 116 may include several notches that suggest relatedness values, the final values chosen may vary on a per-user basis. The system may determine the actual relationship value for two tags as the weighted average of all of the relationship strengths specified by users (for those two tags).

Figure 2:
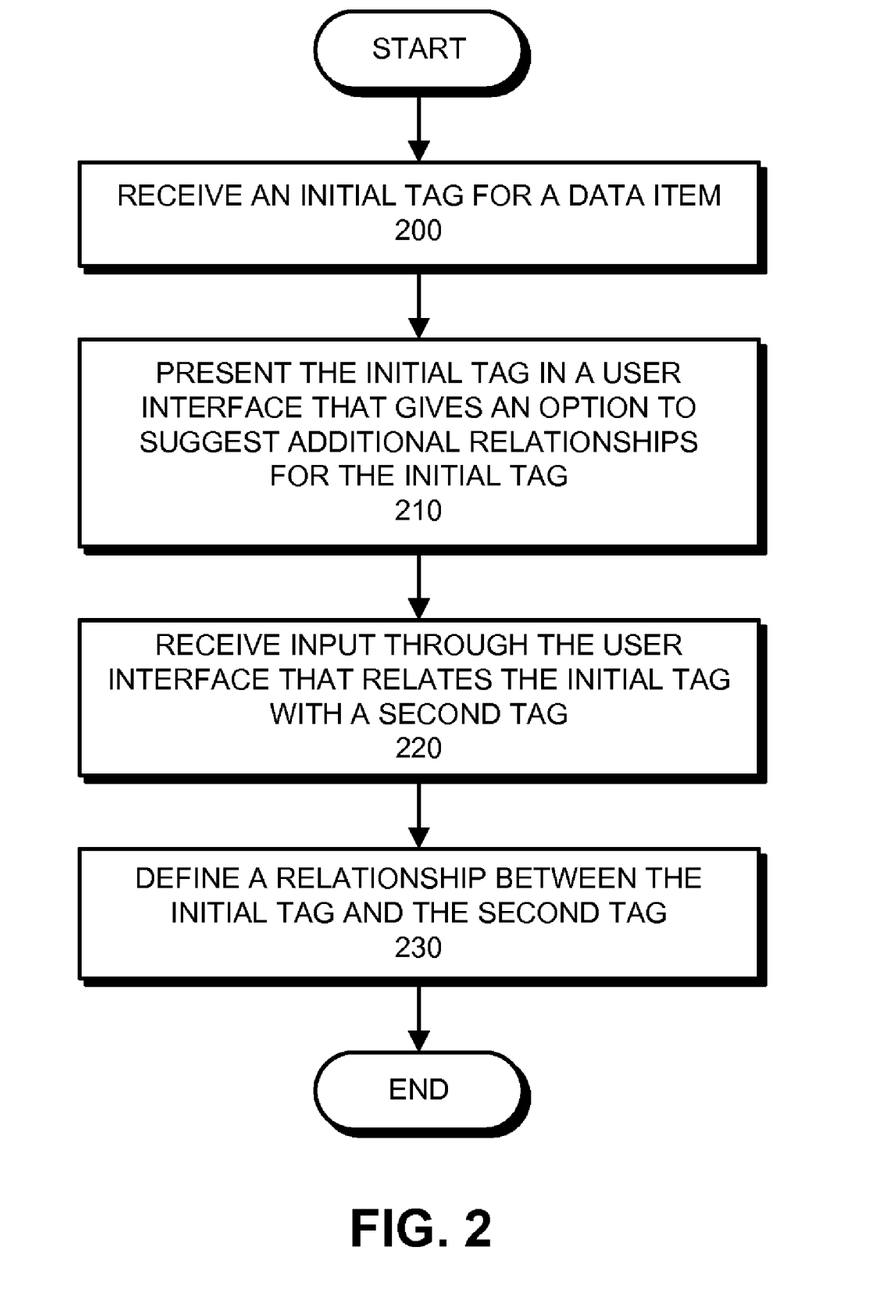
FIG. 2 presents a flow chart illustrating the process of defining relationships between tags in accordance with an embodiment of the present invention.

FIG. 2 presents a flow chart illustrating the process of defining relationships between tags. During operation, the system receives an initial tag for a data item (operation 200), where the initial tag is a user-specified term that describes the data item. The system presents this initial tag to the user in a user interface that presents the user with an option to suggest additional relationships for the initial tag (operation 210). When the system receives user input through the user interface that relates the initial tag with a second tag (operation 220), the system defines a relationship between the two tags (operation 230). Note that defining relationships between the initial tag and the second tag facilitates defining a set of related tags for an organization.

In some embodiments of the present invention, enabling users to define relationships between two tags allows additional descriptive terms to be associated with a data item and improves the likelihood that the data item will be found during a search. Note that such techniques allow relationships to be defined for organization-specific tags that might otherwise be difficult to find in search operations. For instance, an employee who is new to an organization might be unfamiliar with organization-specific terminology. However, if other users have defined relationships between organization-specific tags and more commonly-known tags, the new employee may still be able to find results from the set of organization-specific data items using commonly-known tags, and in the process can be exposed to and become aware of the organization-specific terms. For example, a new employee might not know that an organization-specific, innovation-promoting event is called "hactivism" (e.g., a combination of "hacking" and "activism"). However, if a relationship is defined that specifies that the tag terms "hactivism" and "innovation" are closely related (e.g., very similar, but not quite synonymous), the new employee might be able to find information for the event (and in the process become aware of the organization-specific vocabulary) while searching for items tagged with the term "innovation." Hence, the described techniques can be used to define relationships for organization-specific (or "tribal") terms that are ambiguous and/or might not show up in common reference materials (such as a dictionary), and thus otherwise might not be easily related to other terms. Developing a context for such terms for a given community (e.g., an organization and/or a corporation) facilitates searching and finding related concepts more easily.

Note that the described techniques depend on inspiring user participation. More specifically, motivating users to define relationships between tags may involve a range of incentives that depends upon the given user environment. For instance, in some applications, users may define such relationships for purely altruistic reasons. In other applications, users may be motivated to define relationships for tag terms to enhance their ability to find other users with similar interests. Alternatively, users may be motivated to define relationships between tags to increase a "user participation" score that is associated with their user accounts.

In some embodiments of the present invention, the system tracks both the set of defined relationships as well as the set of users who have defined the relationships. For instance, the system may maintain a database and/or data structures that track: a counter that tracks how many users have suggested relationships for each given pair of tags; the users who have provided input for each set of related tags; and/or the set of relationship strengths defined for each set of related tags. The system can use this information to update the weighted average for a given relationship when additional user input is received, as well as to ensure that users cannot manipulate relationships between tags. For instance, by tracking who suggests relationships, the system can prevent a user from repeatedly suggesting a relationship between two tags to inflate the strength and/or average weight of the relationship.

Note that the system may perform checks using the tracked data. For instance, the system may include a set of rules for handling outlier values when averaging results defined by multiple users. The system may also provide a mechanism that allows a user who discovers an erroneous relationship to bring the error to the attention of an administrative panel and/or moderator. Note that such notification may be needed to adjust a relationship value significantly, because a single user's input may be insufficient to affect an existing erroneous relationship strength that has been created by multiple other users.

In some embodiments of the present invention, the system can be implemented in a number of ways, and can include both hardware and software. For instance, an existing relational database used to store tags may be extended to include a "tag link" data entity. This tag link might include the two tags and a user-suggested relatedness value (e.g., between 0 and 100). In some embodiments, this tag link may also include information on users that have already suggested a relatedness value to prevent gaming of the system and to preserve uniqueness of input.

In some embodiments of the present invention, the system includes visualization tools that can be used to display relationships between tags. For instance, such visualization tools may visually display the full set of related tags for a given tag, along with the strengths of each relationship. Such visualization tools may be used to facilitate search operations, for example by suggesting additional related tag terms that can be used for a given search operation.

Computing Environment

In one embodiment of the present invention, the described system can be incorporated into and/or accessed by a wide range of computing devices in a computing environment. For instance, tagging techniques may be implemented on or by a single computing device, or may be shared across multiple applications and/or computing devices.

Figure 3:
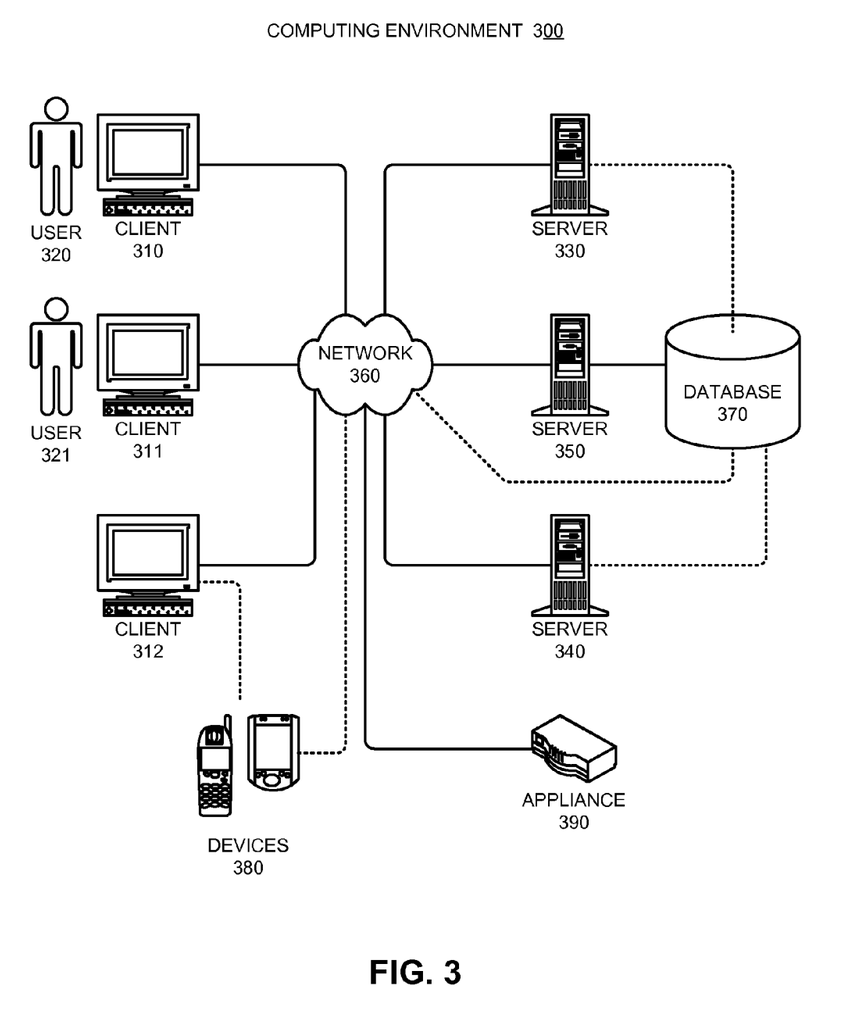
FIG. 3 illustrates a computing environment in accordance with an embodiment of the present invention.

FIG. 3 illustrates a computing environment 300 in accordance with an embodiment of the present invention. Computing environment 300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 3, computing environment 300 includes clients 310-312, users 320 and 321, servers 330-350, network 360, database 370, devices 380, and appliance 390.

Clients 310-312 can include any node on a network including computational capability and including a mechanism for communicating across the network. Additionally, clients 310-312 may comprise a tier in an n-tier application architecture, wherein clients 310-312 perform as servers (servicing requests from lower tiers or users), and wherein clients 310-312 perform as clients (forwarding the requests to a higher tier).

Similarly, servers 330-350 can generally include any node on a network including a mechanism for servicing requests from a client for computational and/or data storage resources. Servers 330-350 can participate in an advanced computing cluster, or can act as stand-alone servers. In one embodiment of the present invention, server 340 is an online "hot spare" of server 350.

Users 320 and 321 can include: an individual; a group of individuals; an organization; a group of organizations; a computing system; a group of computing systems; or any other entity that can interact with computing environment 300.

Network 360 can include any type of wired or wireless communication channel capable of coupling together computing nodes. This includes, but is not limited to, a local area network, a wide area network, or a combination of networks. In one embodiment of the present invention, network 360 includes the Internet. In some embodiments of the present invention, network 360 includes phone and cellular phone networks.

Database 370 can include any type of system for storing data in non-volatile storage. This includes, but is not limited to, systems based upon magnetic, optical, or magneto-optical storage devices, as well as storage devices based on flash memory and/or battery-backed up memory. Note that database 370 can be coupled: to a server (such as server 350), to a client, or directly to a network. In some embodiments of the present invention, database 370 is used to store information related to tags and tag relationships. Alternatively, other entities in computing environment 300 may also store data related to tags (e.g., servers 330-350).

Devices 380 can include any type of electronic device that can be coupled to a client, such as client 312. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 380 can be coupled directly to network 360 and can function in the same manner as clients 310-312.

Appliance 390 can include any type of appliance that can be coupled to network 360. This includes, but is not limited to, routers, switches, load balancers, network accelerators, and specialty processors. Appliance 390 may act as a gateway, a proxy, or a translator between server 340 and network 360.

Note that different embodiments of the present invention may use different system configurations, and are not limited to the system configuration illustrated in computing environment 300. In general, any device that is capable of communicating via network 360 may incorporate elements of the present invention.

Figure 4:
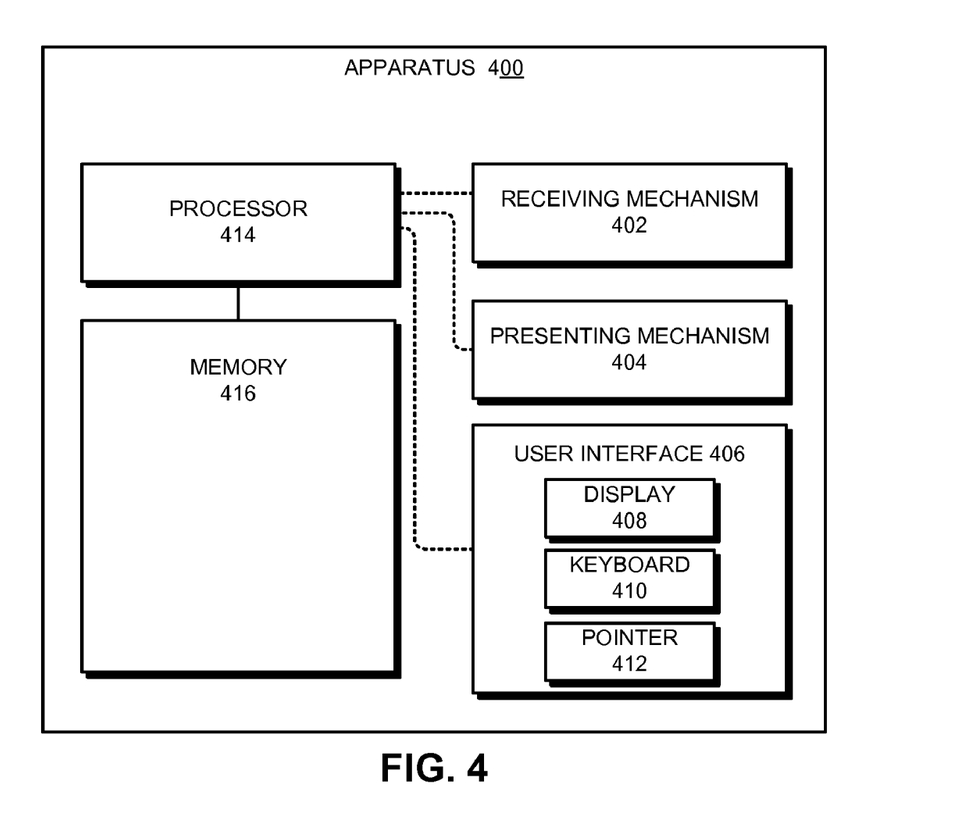
FIG. 4 illustrates an apparatus that defines relationships between tags in accordance with an embodiment of the present invention.

FIG. 4 illustrates an apparatus 400 that defines relationships between tags in accordance with an embodiment of the present invention. Apparatus 400 includes receiving mechanism 402, presenting mechanism 404, user interface 406, processor 414, and memory 416. Moreover, the user interface 406 may include: a display 408, a keyboard 410, and/or a pointer 412, such as a mouse. During operation, receiving mechanism 402 is configured to receive tags that are associated with data items as well as user input from a user interface that defines a relationship between two tags. Moreover, presenting mechanism 404 is configured to present tag information to users via user interface 406.

In summary, embodiments of the present invention provide a system that enables users to define relationships between tags. This capability enables users to associate additional descriptive terms with a data item, thereby improving the likelihood that the data item will be found during a search operation. Allowing users to specify relationships between tags also facilitates defining relationships for organization-specific tags that might otherwise be difficult to find in search operations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for defining relationships between tags, wherein a tag is a user-specified term that describes a data item, comprising:
   receiving an initial tag for the data item;
   presenting the initial tag in a user interface, where the user interface includes an option to suggest additional relationships for the initial tag;
   receiving user input through the user interface that relates the initial tag with a second tag, wherein defining a relationship between the initial tag and the second tag facilitates defining a set of related tags for an organization; and
   tracking data associated with the relationship, wherein tracking data associated with the relationship involves one or more of the following:
      tracking a set of users who have suggested relationships between the initial tag and the second tag;
      tracking a set of relationship strengths defined between the initial tag and the second tag; and
      averaging the set of relationship strengths between the initial tag and the second tag to determine an average value for the relationship between the initial tag and the second tag.

2. The method of claim 1,
   wherein multiple synonymous tags are used to describe the data item; and
   wherein defining the relationship facilitates associating additional descriptive terms with the data item, thereby improving the likelihood that the data item can be found during a search operation.

3. The method of claim 1, wherein defining the relationship further involves expressing the strength of the relationship between the initial tag and the second tag using a percentage scale.

4. The method of claim 3, wherein defining the relationship involves specifying one or more of the following:
   that the initial tag and the second tag are unrelated;
   that the initial tag and the second tag specify loosely-related concepts;
   that the initial tag and the second tag specify closely-related concepts; and/or
   that the initial tag and the second tag are synonymous.

5. The method of claim 1,
   wherein the initial tag and/or the second tag specify terms that are specific to the organization; and
   wherein the method further comprises defining relationships for organization-specific terms that are otherwise difficult to relate automatically.

6. The method of claim 1, wherein tracking the set of users facilitates ensuring that users cannot manipulate relationships between the initial tag and/or the second tag.

7. The method of claim 1, wherein the method further involves using a visualization tool that displays the strength of relationships between two or more related tags.

8. A computer-readable storage medium storing instructions that when executed by a computer cause the computer to perform a method for defining relationships between tags, wherein a tag is a user-specified term that describes a data item, the method comprising:
   receiving an initial tag for the data item;
   presenting the initial tag in a user interface, where the user interface includes an option to suggest additional relationships for the initial tag;
   receiving user input through the user interface that relates the initial tag with a second tag, wherein defining a relationship between the initial tag and the second tag facilitates defining a set of related tags for an organization; and
   tracking data associated with the relationship, wherein tracking data associated with the relationship involves one or more of the following:
      tracking a set of users who have suggested relationships between the initial tag and the second tag;
      tracking a set of relationship strengths defined between the initial tag and the second tag; and
      averaging the set of relationship strengths between the initial tag and the second tag to determine an average value for the relationship between the initial tag and the second tag.

9. The computer-readable storage medium of claim 8,
   wherein multiple synonymous tags are used to describe the data item; and wherein defining the relationship facilitates associating additional descriptive terms with the data item, thereby improving the likelihood that the data item can be found during a search operation.

10. The computer-readable storage medium of claim 8, wherein defining the relationship further involves expressing the strength of the relationship between the initial tag and the second tag using a percentage scale.

11. The computer-readable storage medium of claim 10, wherein defining the relationship involves specifying one or more of the following:
   that the initial tag and the second tag are unrelated;
   that the initial tag and the second tag specify loosely-related concepts;
   that the initial tag and the second tag specify closely-related concepts; and/or
   that the initial tag and the second tag are synonymous.

12. The computer-readable storage medium of claim 8,
   wherein the initial tag and/or the second tag specify terms that are specific to the organization; and
   wherein the method further comprises defining relationships for organization-specific terms that are otherwise difficult to relate automatically.

13. The computer-readable storage medium of claim 8, wherein tracking the set of users facilitates ensuring that users cannot manipulate relationships between the initial tag and/or the second tag.

14. The computer-readable storage medium of claim 8, wherein the method further involves using a visualization tool that displays the strength of relationships between two or more related tags.

15. An apparatus that defines relationships between tags, wherein a tag is a user-specified term that describes a data item, comprising:
   a receiving mechanism configured to receive an initial tag for the data item; and
   a presenting mechanism configured to present the initial tag in a user interface, where the user interface includes an option to suggest additional relationships for the initial tag;
   wherein the receiving mechanism is further configured to receive user input through the user interface that relates the initial tag with a second tag, wherein defining a relationship between the initial tag and the second tag facilitates defining a set of related tags for an organization;
   wherein the receiving mechanism is further configured to track data associated with the relationship; and
   wherein tracking data associated with the relationship involves one or more of the following:
      tracking a set of users who have suggested relationships between the initial tag and the second tag;
      tracking a set of relationship strengths defined between the initial tag and the second tag; and
      averaging the set of relationship strengths between the initial tag and the second tag to determine an average value for the relationship between the initial tag and the second tag.

16. The apparatus of claim 15,
   wherein multiple synonymous tags are used to describe the data item; and
   wherein defining the relationship facilitates associating additional descriptive terms with the data item, thereby improving the likelihood that the data item can be found during a search operation.

17. The apparatus of claim 15, wherein defining the relationship further involves expressing the strength of the relationship between the initial tag and the second tag using a percentage scale.

18. The apparatus of claim 17, wherein defining the relationship involves specifying one or more of the following:
   that the initial tag and the second tag are unrelated;
   that the initial tag and the second tag specify loosely-related concepts;
   that the initial tag and the second tag specify closely-related concepts; and/or
   that the initial tag and the second tag are synonymous.

* * * * *